US011331865B2

United States Patent
Ding et al.

(10) Patent No.: US 11,331,865 B2
(45) Date of Patent: May 17, 2022

(54) METHOD FOR PRODUCING A HOLLOW SUPPORT FROM A FIBER COMPOSITE MATERIAL, CORE DESIGNED AS A HOLLOW BODY, USE OF SAID CORE, AND USE OF SAID HOLLOW SUPPORT MADE FROM FIBER COMPOSITE

(71) Applicants: CRRC QINGDAO SIFANG CO., LTD., Shandong (CN); CG RAIL-CHINESISCH-DEUTSCHES FORSCHUNGS-UND ENTWICKLUNGSZENTRUM FüR BAHN-UND VERKEHRSTECHNIK DRESDEN GMBH, Dresden (DE)

(72) Inventors: Sansan Ding, Shandong (CN); Xiaojun Deng, Shandong (CN); Yuwen Liu, Shandong (CN); Xu Chen, Shandong (CN); Li Dong, Shandong (CN); Mao Cai, Shandong (CN); Xu Zhang, Shandong (CN); Werner Hufenbach, Dresden (DE); Andreas Ulbricht, Dresden (DE)

(73) Assignees: CRRC QINGDAO SIFANG CO., LTD., Qingdao (CN); CG RAIL-CHINESISCH-DEUTSCHES FORSCHUNGS-UND ENTWICKLUNGSZENTRUM FüR BAHN-UND VERKEHRSTECHNIK DRESDEN GMBH, Dresden (DE)

( * ) Notice: Subject to any disclaimer, the term of this patent is extended or adjusted under 35 U.S.C. 154(b) by 427 days.

(21) Appl. No.: 16/484,783

(22) PCT Filed: Feb. 1, 2018

(86) PCT No.: PCT/EP2018/052522
§ 371 (c)(1),
(2) Date: Aug. 8, 2019

(87) PCT Pub. No.: WO2018/145993
PCT Pub. Date: Aug. 16, 2018

(65) Prior Publication Data
US 2019/0351630 A1 Nov. 21, 2019

(30) Foreign Application Priority Data

Feb. 9, 2017 (DE) .................. 10 2017 102 565.0

(51) Int. Cl.
*B29C 70/44* (2006.01)
*B29C 70/54* (2006.01)
(Continued)

(52) U.S. Cl.
CPC .............. *B29C 70/54* (2013.01); *B29C 33/52* (2013.01); *B29C 70/347* (2013.01);
(Continued)

(58) Field of Classification Search
CPC ..... B29C 70/44; B29C 70/443; B29C 70/446; B29C 70/462; B29C 70/48
See application file for complete search history.

(56) References Cited

U.S. PATENT DOCUMENTS

| 5,000,990 A | 3/1991 | Freeman |
| 5,156,786 A | 10/1992 | Monroe |

(Continued)

FOREIGN PATENT DOCUMENTS

| CN | 86105307 A | 4/1987 |
| CN | 105690798 A | 6/2016 |

(Continued)

OTHER PUBLICATIONS

Machine Translation of Japanese Patent 07-031336, Date Unknown.*
(Continued)

*Primary Examiner* — Jeffry H Aftergut
(74) *Attorney, Agent, or Firm* — Yue (Robert) Xu; Apex Attorneys at Law, LLP

(57) ABSTRACT

The application relates to a method for producing a hollow support from a fiber composite material, to a core designed
(Continued)

as a hollow body, to the use of said core, and to the use of said hollow support made from fiber composite material.

15 Claims, 2 Drawing Sheets

(51) Int. Cl.
    *B29C 33/52*     (2006.01)
    *B29C 70/34*     (2006.01)
    *B29K 63/00*     (2006.01)
    *B29K 105/08*     (2006.01)
    *B29K 307/04*     (2006.01)
    *B29L 31/30*     (2006.01)

(52) U.S. Cl.
    CPC ........ *B29C 70/446* (2013.01); *B29K 2063/00* (2013.01); *B29K 2105/0881* (2013.01); *B29K 2307/04* (2013.01); *B29K 2829/04* (2013.01); *B29K 2995/0062* (2013.01); *B29L 2031/3064* (2013.01)

(56) References Cited

U.S. PATENT DOCUMENTS

| | | |
|---|---|---|
| 2002/0038923 A1 | 4/2002 | Lenherr |
| 2005/0191919 A1 | 9/2005 | Krogager et al. |
| 2013/0113175 A1 | 5/2013 | Renner et al. |
| 2017/0341318 A1 | 11/2017 | Von Koenigsegg |

FOREIGN PATENT DOCUMENTS

| | | | |
|---|---|---|---|
| DE | 10342867 A1 | 4/2005 | |
| DE | 102005011930 B3 | 9/2006 | |
| DE | 102008016616 A1 | 10/2009 | |
| DE | 102010056293 A1 | 6/2012 | |
| DE | 102011085029 A1 | 4/2013 | |
| EP | 0465169 A1 | 1/1992 | |
| EP | 1197309 B1 | 4/2004 | |
| EP | 2327525 A1 | 6/2011 | |
| JP | 07-031336 A | * | 2/1995 |
| JP | H07316379 A | 12/1995 | |
| JP | 2000108210 A | 4/2000 | |
| JP | 2003053754 A | 2/2003 | |
| WO | 9406610 A1 | 3/1994 | |
| WO | 2010007162 A1 | 1/2010 | |
| WO | 2016097093 A1 | 6/2016 | |

OTHER PUBLICATIONS

The Chinese 1st Office Action dated Oct. 28, 2020 for Chinese Application No. CN201880010488.2.
The Japanese 1st Office Action dated Sep. 3, 2020 for Japanese Application No. JP2019-543293.
International Search Report for PCT/EP2018/052522 dated May 7, 2018, ISA/CN.

* cited by examiner

METHOD FOR PRODUCING A HOLLOW SUPPORT FROM A FIBER COMPOSITE MATERIAL, CORE DESIGNED AS A HOLLOW BODY, USE OF SAID CORE, AND USE OF SAID HOLLOW SUPPORT MADE FROM FIBER COMPOSITE

This application is a National Phase entry of PCT Application No. PCT/EP2018/052522, filed on Feb. 1, 2018, which claims the priority of German patent application No. DE 10 2017 102 565.0 filed on Feb. 9, 2017, the entire disclosures of the applications are incorporated herein by reference.

FIELD

The invention relates to a method for producing a hollow support from a fibre composite material, a core formed as a hollow body as well as the use thereof, and the use of the hollow support made of fibre composite material.

BACKGROUND

In the production of hollow components from fibre composite material (also fibre-plastic composite material, FRP material), moulded bodies in the form of cores with partly very complicated geometries are used for the fibre deposition. The geometry of the core determines the geometry of the fibre composite component.

In principle it is possible to use permanent cores which can be removed from a component, for example, using draft angles or thermal shrinkage. In the case of more complex geometries with undercuts and/or curvatures, it is not readily possible to remove a core so that in these cases lost cores are usually used. The cores must have sufficient dimensional accuracy, offer the possibility for use in automated processes and enable complex geometries to be represented.

In addition, a core for fibre deposition must be very stable since, for example during machine braiding or winding, high tensile and/or compressive forces act on the core.

From the state of the art, e.g. from DE 10 2011 085029 A1, the use of cores made of foamed plastic is known, which remain in the component after the fibre deposition. Disadvantageously, the foamed plastic has only a limited mechanical stability. In addition, it is disadvantageous for many applications for a core to remain in the component.

EP 1 197 309 B1 describes the use of lost cores made of wax which, after the production of the component, are melted out and are therefore no longer to be found in the finished component. Disadvantageously, the method is very time-consuming for example because it is necessary to wait for the wax to set completely in each case. Furthermore, wax as core material again has only limited tensile and compressive strength.

Due to the limited stability, cores made of water-soluble materials such as "Aquacore", that can be washed out, are likewise not very suitable for applications in which high tensile and/or compressive forces occur.

DE 10 2008 016 616 A1 describes a method for producing a hollow fibre composite component in which a preform made of fibres is wound or woven or braided directly onto a core, and the preform is then placed with the core in a cavity of an injection moulding tool, wherein a hollow body made of plastic is used as core. This is in particular a blow moulded body.

DE 10 2010 056 293 A1 describes a method for producing a hollow fibre composite component in which a lost starting moulded body, in particular a blow moulded body, is surrounded with at least one ply of reinforcing fibres, which is then undetachably covered with a flexible sealing agent in order to form a reusable tubular moulded body, wherein the reinforcing fibres and the flexible sealing agent are arranged such that the reinforcing fibres alternate between the inner and the outer surface of the moulded body. The moulded body is then inflated and overlaid with the reinforcing fibres of the fibre composite component. Disadvantageously, the method is very time-consuming and suitable primarily for the production of thin-walled fibre composite components.

SUMMARY

The object of the present invention is to propose a method for producing complex fibre composite components in the form of hollow supports and an associated core which overcome the above-named disadvantages of the state of the art and are suitable in particular for producing thick-walled fibre composite components.

The object is achieved by the method according to the invention with the features listed in claim 1. The object is furthermore achieved by a core with the features of claim 9. Preferred developments of the invention are the subject of dependent claims.

The method according to the invention for producing a hollow support from a fibre composite material comprises at least the following method steps:

preparing a moulded body, formed as a hollow body, from a fibre composite material comprising reinforcing fibres and a soluble plastic matrix made of a matrix material soluble using a solvent;

arranging a vacuum setup comprising at least one, preferably several, film-like layers, or a pressure hose, on the outer surface of the moulded body;

depositing the reinforcing fibres of the hollow support on the outer surface of the vacuum setup or pressure hose arranged on the outer surface of the moulded body to form a hollow support preform;

arranging the hollow support preform in an outer tool;

infiltrating the reinforcing fibres of the hollow support with matrix material;

generating a negative pressure between vacuum setup and inner surface of the outer tool or a positive pressure between outer surface of the moulded body and pressure hose;

consolidating the fibre composite made of reinforcing fibres and matrix material of the hollow support with the formation of an outer surface of the hollow support formed on the inner surface of the outer tool;

removing the consolidated hollow support from the outer tool;

removing the soluble plastic matrix of the moulded body by dissolving using a solvent;

removing the reinforcing fibres of the moulded body and of the vacuum setup via at least one front side of the hollow support.

With the method according to the invention in particular thick-walled hollow supports made of fibre composite material and/or hollow supports with a high fibre volume content can also be produced using a comparatively simple procedure. The method according to the invention enables hollow supports with complex geometries including curvatures, undercuts and cross-section variations to be produced. The hollow, inherently stable moulded body advantageously opens up the possibility of largely automating the method steps of the method according to the invention. A hollow support produced using the method according to the invention has a uniform and crease-free outer contour.

All suitable types of reinforcing fibres, such as natural or synthetic fibres, for example glass or carbon or aramid fibres, or mixtures of different fibre types can be used as fibres, wherein carbon fibres are preferably used.

In principle, all suitable resin systems can be used as matrix material of the hollow support, in particular epoxy resin, vinyl ester resin or polyester resin.

In particular, method step e) can also be carried out after or in combination with method step f).

In an embodiment of the method according to the invention, method step a) comprises the preparation of a moulded body, formed as a hollow body, from a fibre composite material, forming the outer surface of the moulded body on the inner surface of a two- or multi-part outer tool or forming the inner surface of the moulded body on the outer surface of a core as inner tool.

In a further embodiment of the method according to the invention, method step a) comprises the preparation of a moulded body, formed as a hollow body, from a fibre composite material, the depositing of sheets, pre-finished by impregnation with the soluble matrix material, made of a reinforcing fibre woven fabric or a preferably unidirectional reinforcing fibre non-crimp fabric, or the depositing of unimpregnated reinforcing fibre woven fabric or a preferably unidirectional unimpregnated reinforcing fibre non-crimp fabric and the impregnation in layers of the individual woven fabric or non-crimp fabric layers with the soluble matrix material.

The depositing of pre-finished sheets made of a reinforcing fibre woven fabric or reinforcing fibre non-crimp fabric, or the depositing of unimpregnated reinforcing fibre woven fabric or reinforcing fibre non-crimp fabric and the impregnation in layers preferably takes place in a two- or multi-part outer tool; the consolidation of the fibre composite material of the mould parts then takes place using a suitable counter tool, for example a solid counter tool or a pressure hose, and removing the mould parts from the tool.

Alternatively, the depositing of pre-finished sheets made of a reinforcing fibre woven fabric or reinforcing fibre non-crimp fabric or the winding of reinforcing fibres and subsequent impregnation with matrix material preferably takes place on a core, in particular a core made of a light metal such as aluminium, as inner tool; the consolidation of the fibre composite material of the moulded body then takes place using a suitable counter tool, for example a solid counter tool or a pressure hose. Removing the inner tool is effected by separating the moulded body.

Joining the mould parts to form a moulded body is preferably effected in that a pre-finished sheet of a fibre composite material of the same type as that of the moulded body is arranged over the separation points and is connected to the surface of the moulded body.

In a further embodiment of the method according to the invention, the matrix material of the moulded body is soluble in water. Advantageously, the moulded body can thereby be removed particularly easily from the hollow support to be produced.

The matrix material of the moulded body is preferably polyvinyl alcohol=PVA. Advantageously, moulded bodies with PVA matrix are particularly stable and highly resilient, such that high tensile and compressive forces can be absorbed well.

Method step b) of the method according to the invention comprises arranging a vacuum setup comprising at least one, preferably several, film-like layers on the outer surface of the moulded body. The vacuum setup preferably encases the moulded body in the manner of a tube. The vacuum setup is particularly preferably a VAP setup (VAP=Vacuum Assisted Process) known from the state of the art. Through the use of a vacuum setup, and in particular a VAP setup, the infiltration quality is advantageously increased in particular in the case of the production of thick-walled hollow supports.

In a further embodiment of the method according to the invention, the vacuum setup has at least one layer consisting of a gas-impermeable vacuum film.

In a further embodiment of the method according to the invention, the vacuum setup has at least one layer consisting of a semi-permeable membrane. This membrane is designed permeable to gas but impermeable to the matrix material of the hollow support.

The method according to the invention preferably comprises a further method step for introducing local reinforcements in the form of thickened wall thicknesses of the fibre composite material of the hollow support, for example at particularly loaded points or in the vicinity of bores. For this, after method step b), for example reinforcing fibre semi-finished parts or in particular pre-finished reinforcing fibre sheets are placed at the points of the hollow support to be correspondingly thickened on the outer surface of the moulded body on which a vacuum setup or a pressure hose is arranged. This particularly preferred embodiment advantageously makes it possible to design the hollow support to be produced using the method according to the invention in a manner compatible with the distribution of forces.

In a further embodiment of the method according to the invention, the reinforcing fibres of the hollow support are deposited in braided form in method step c). Because of the low mass of the hollow moulded body, braiding robots can advantageously be used for this.

A subject of the invention is also a core, formed as a hollow body, for producing a hollow support from a fibre composite material, comprising a plastic matrix made of polyvinyl alcohol=PVA. Advantageously, the core according to the invention is soluble in water, light and particularly highly resilient.

A further subject of the invention is the use of a core according to the invention for fibre deposition for producing hollow supports from fibre composite material.

A further subject of the invention is likewise the use of a hollow support made of fibre composite material, produced using the method according to the invention, as longitudinal or cross beam of a frame of a bogie for a rail vehicle. Advantageously, such a longitudinal or cross beam is characterized by a particularly low mass, which leads to energy saving in the rail vehicle.

BRIEF DESCRIPTION OF THE DRAWINGS

Embodiment examples of the invention are explained below with reference to figures, without limiting the invention to them.

DETAILED DESCRIPTION

Figure 1:
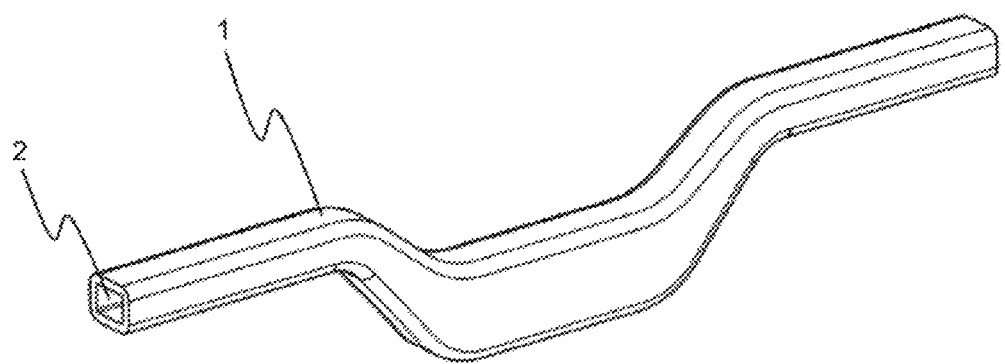

FIG. 1 shows a hollow support 1 made of fibre composite material with a complex geometry, produced using the method according to the invention. The hollow support 1 can be used as a longitudinal beam of a bogie for a rail vehicle. The hollow support 1 has a multiply curved outer contour and a cross section that varies in the longitudinal direction of the beam. The shape of the outer contour of the core used for the production of the hollow support 1 (not represented)

corresponds to that of the hollow support 1. The reinforcing fibres of the hollow support 1 are deposited on the VAP setup (not represented), which is arranged on the core (not represented), at least partially in braided form using one braiding gear or several braiding gears. The reinforcing fibres are carbon fibres; an epoxy resin is used as matrix material. After the water-soluble PVA matrix used for the core has been dissolved and flushed out of the hollow support interior, the remaining core residues, e.g. the reinforcing fibres (also carbon fibres) of the core, as well as the VAP setup can be removed from the hollow support interior via the open front side 2 of the hollow support 1.

Figure 2:
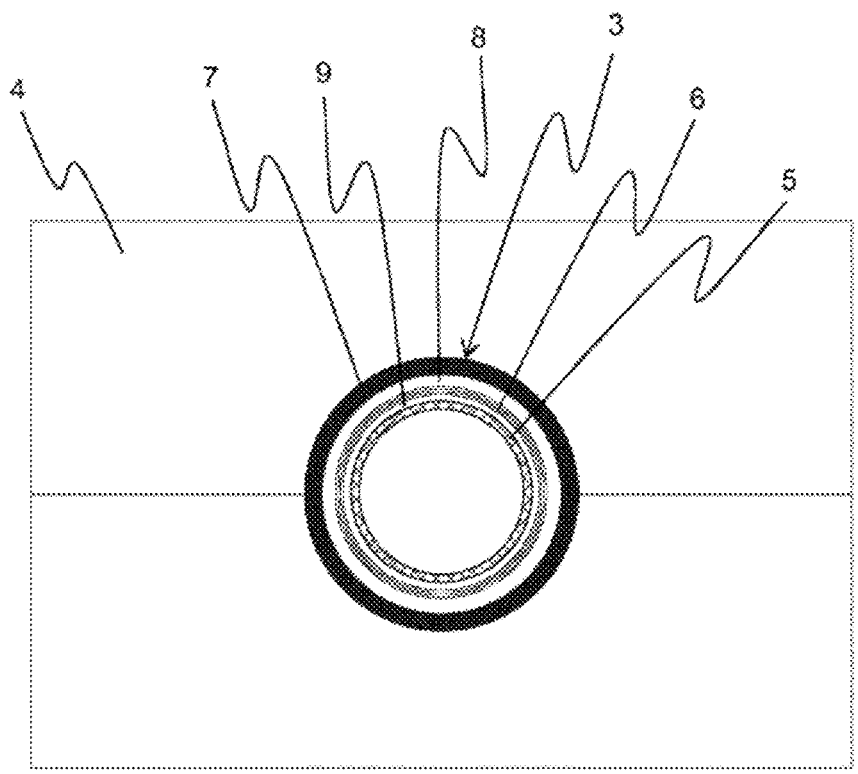

FIG. 2 illustrates the arrangement of a hollow support preform 3 in an outer tool 4. The hollow support preform 3 comprises (from the inside out) the core 5, the VAP setup 6 and the reinforcing fibres 7 of the hollow support. The core 5 is a hollow body made of a fibre composite material with a water-soluble plastic matrix, in particular a PVA matrix.

The VAP setup 6 encasing the core 5 is constructed of several layers and can also comprise for example, in addition to a gas-permeable layer that is, however, impermeable to matrix material, a flow-promoter layer, a protective non-woven fabric and a vacuum film layer. A vacuum film layer is arranged on the core. The carbon reinforcing fibres 7 of the hollow support are deposited on the VAP setup 6.

After the hollow support preform 3 is placed in the outer tool 4, a negative pressure is generated by pumping the air out of the negative pressure space 8 between the reinforcing fibres 7 of the hollow support and the VAP setup 6. The VAP setup thereby bears on the reinforcing fibres 7 of the hollow support and presses them against the inner surface of the outer tool 4. If the matrix material of the hollow support is infiltrated while the air is being pumped out of the negative pressure space 8, it can wet the reinforcing fibres 7 particularly evenly, and a high infiltration quality is achieved.

For thin-walled components a sufficient infiltration quality can also be achieved if the multi-layered VAP setup with the final vacuum film layer arranged on the core is replaced by a single vacuum film layer or a pressure hose (not represented). If a pressure hose is used, a positive pressure is generated in the interspace 9, instead of a negative pressure in the negative pressure space 8, as a result of which the pressure hose is pressed against the reinforcing fibres 7.

The consolidation of the fibre composite of the hollow support under increased temperature follows the described method steps.

REFERENCE NUMBERS 1 hollow support
2 front side
3 hollow support preform
4 outer tool
5 core
6 VAP setup
7 reinforcing fibres
8 negative pressure space
9 interspace

The invention claimed is:

1. Method for producing a hollow support from a fibre composite material, comprising at least the following method steps:
   a) preparing a moulded body, formed as a hollow body, from a fibre composite material comprising reinforcing fibres and a soluble plastic matrix made of a matrix material soluble using a solvent;
   b) arranging a vacuum setup comprising at least one film-like layers, or a pressure hose, on the outer surface of the moulded body;
   c) depositing the reinforcing fibres of the hollow support on the outer surface of the vacuum setup or pressure hose arranged on the outer surface of the moulded body to form a hollow support preform;
   d) arranging the hollow support preform in an outer tool;
   e) infiltrating the reinforcing fibres of the hollow support with matrix material;
   f) generating a negative pressure between vacuum setup and inner surface of the outer tool or a positive pressure between outer surface of the moulded body and pressure hose;
   g) consolidating the fibre composite of the hollow support made of reinforcing fibres and matrix material with the formation of an outer surface of the hollow support formed on the inner surface of the outer tool;
   h) removing the consolidated hollow support from the outer tool;
   i) removing the soluble plastic matrix of the moulded body by dissolving using a solvent;
   j) removing the reinforcing fibres of the moulded body and of the vacuum setup via one of the front sides of the hollow support.

2. Method for producing a hollow support from a fibre composite material according to claim 1, wherein the preparation of the moulded body in method step a) comprises
   forming the outer surface of the moulded body made of fibre composite material on the inner surface of a two- or multi-part outer tool
   or
   forming the inner surface of the moulded body made of fibre composite material on the outer surface of a core as inner tool.

3. Method for producing a hollow support from a fibre composite material according to claim 1, wherein the preparation of the moulded body comprises
   the depositing of sheets made of a woven fabric or an unidirectional non-crimp fabric pre-finished by impregnation with the soluble matrix material;
   or
   the depositing of unimpregnated woven fabric or an unidirectional unimpregnated non-crimp fabric and the impregnation in layers with the soluble matrix material.

4. Method for producing a hollow support from a fibre composite material according to claim 1, wherein the matrix material of the moulded body is soluble in water.

5. Method for producing a hollow support from a fibre composite material according to claim 4, wherein the matrix material of the moulded body is polyvinyl alcohol (PVA).

6. Method for producing a hollow support from a fibre composite material according to claim 1, wherein the vacuum setup comprises at least one layer consisting of a vacuum film.

7. Method for producing a hollow support from a fibre composite material according to claim 1, wherein the vacuum setup comprises at least one layer consisting of a semi-permeable membrane.

8. Method for producing a hollow support from a fibre composite material according to claim 1, wherein the reinforcing fibres of the hollow support are deposited in a braided form in method step c).

9. Method for producing a hollow support from a fibre composite material according to claim 2, wherein the preparation of the moulded body comprises the depositing of sheets made of a woven fabric or an unidirectional non-crimp fabric pre-finished by impregnation with the soluble matrix material;
or
the depositing of unimpregnated woven fabric or an unidirectional unimpregnated non-crimp fabric and the impregnation in layers with the soluble matrix material.

10. Method for producing a hollow support from a fibre composite material according to claim 2, wherein the matrix material of the moulded body is soluble in water.

11. Method for producing a hollow support from a fibre composite material according to claim 3, wherein the matrix material of the moulded body is soluble in water.

12. Method for producing a hollow support from a fibre composite material according to claim 2, wherein the vacuum setup comprises at least one layer consisting of a vacuum film.

13. Method for producing a hollow support from a fibre composite material according to claim 3, wherein the vacuum setup comprises at least one layer consisting of a vacuum film.

14. Method for producing a hollow support from a fibre composite material according to claim 4, wherein the vacuum setup comprises at least one layer consisting of a vacuum film.

15. Method for producing a hollow support from a fibre composite material according to claim 5, wherein the vacuum setup comprises at least one layer consisting of a vacuum film.

\* \* \* \* \*